US012750938B2

(12) United States Patent
Takman et al.

(10) Patent No.: US 12,750,938 B2
(45) Date of Patent: Sep. 29, 2026

(54) METHOD AND ARRANGEMENT FOR AN X-RAY SOURCE

(71) Applicant: Excillum AB, Kista (SE)

(72) Inventors: Per Takman, Kista (SE); Tomi Tuohimaa, Kista (SE); Ulf Lundström, Kista (SE)

(73) Assignee: EXCILLUM AB, Kista (SE)

( * ) Notice: Subject to any disclaimer, the term of this patent is extended or adjusted under 35 U.S.C. 154(b) by 67 days.

(21) Appl. No.: 18/717,615

(22) PCT Filed: Dec. 6, 2022

(86) PCT No.: PCT/EP2022/084577
§ 371 (c)(1),
(2) Date: Jun. 7, 2024

(87) PCT Pub. No.: WO2023/104785
PCT Pub. Date: Jun. 15, 2023

(65) Prior Publication Data

US 2025/0046560 A1 Feb. 6, 2025

(30) Foreign Application Priority Data

Dec. 8, 2021 (EP) .................................... 21213046

(51) Int. Cl.
*H05G 1/52* (2006.01)
*H01J 35/06* (2006.01)
*H01J 35/14* (2006.01)

(52) U.S. Cl.
CPC ............ *H05G 1/52* (2013.01); *H01J 35/066* (2019.05); *H01J 35/147* (2019.05); *H01J 2235/06* (2013.01)

(58) Field of Classification Search
None
See application file for complete search history.

(56) References Cited

U.S. PATENT DOCUMENTS 7,983,394 B2 * 7/2011 Kozaczek .............. H01J 35/112
378/138
8,968,045 B2 * 3/2015 Saito ......................... H01J 1/13
445/51
(Continued)

FOREIGN PATENT DOCUMENTS

DE 19513291 A1 10/1996
DE 102010009276 A1 * 8/2011 .............. H01J 35/30
(Continued)

OTHER PUBLICATIONS

International Search Report and Written Opinion for PCT Application No. PCT/EP2022/084577, mailed on Mar. 28, 2023, 12 pages.
(Continued)

*Primary Examiner* — Thomas R Artman
(74) *Attorney, Agent, or Firm* — BRAKE HUGHES BELLERMANN LLP

(57) ABSTRACT

There is provided an X-ray source comprising an electron source for providing an electron beam, the electron source comprising a cathode, a Wehnelt, and an anode; an electron optic arrangement configured to deflect and focus the electron beam towards a target for generation of X-ray radiation; an arrangement for determining a quantity indicative of a width of the electron beam; and a controller configured to compute a quantity dependent on a divergence of the electron beam at an entrance of the electron optic arrangement based on the quantity indicative of a width of the electron beam; and apply a bias voltage to the Wehnelt such that the quantity dependent on the divergence of the electron beam at the entrance of the electron optic arrangement is adjusted towards a desired value. A corresponding method is also provided.

14 Claims, 5 Drawing Sheets

(56) References Cited

U.S. PATENT DOCUMENTS

| | | | | |
|---|---|---|---|---|
| 9,380,690 | B2 * | 6/2016 | Hemberg | H01J 35/08 |
| 9,653,248 | B2 * | 5/2017 | Ishihara | H01J 29/50 |
| 9,947,502 | B2 * | 4/2018 | Hemberg | H01J 35/08 |
| 10,283,313 | B2 * | 5/2019 | Nonoguchi | H01J 35/153 |
| 10,573,481 | B1 * | 2/2020 | Katsap | H01J 9/18 |
| 10,999,918 | B2 * | 5/2021 | Koba | H05G 1/265 |
| 11,430,628 | B1 * | 8/2022 | Kobayashi | H01J 37/065 |
| 11,800,625 | B2 * | 10/2023 | Kronstedt | H05G 2/0035 |
| 2011/0150184 | A1 * | 6/2011 | Kozaczek | H01J 35/186 378/138 |
| 2013/0301805 | A1 * | 11/2013 | Hemberg | H05G 1/52 378/137 |
| 2014/0117839 | A1 * | 5/2014 | Saito | H01J 1/13 702/189 |
| 2015/0117617 | A1 * | 4/2015 | Ishihara | H01J 35/147 378/138 |
| 2016/0247656 | A1 * | 8/2016 | Hemberg | H01J 35/08 |
| 2016/0336140 | A1 * | 11/2016 | Nonoguchi | H01J 35/025 |
| 2021/0092823 | A1 * | 3/2021 | Koba | H01J 35/025 |
| 2021/0410260 | A1 * | 12/2021 | Kronstedt | H01J 35/06 |
| 2022/0270842 | A1 * | 8/2022 | Kobayashi | H01J 29/51 |
| 2025/0046560 | A1 * | 2/2025 | Takman | H01J 35/066 |

FOREIGN PATENT DOCUMENTS

| | | | | |
|---|---|---|---|---|
| EP | 3093867 | A1 | | 11/2016 |
| JP | 2007305337 | A | * | 11/2007 |
| JP | 2008311174 | A | | 12/2008 |
| JP | 2018098395 | A | | 6/2018 |

OTHER PUBLICATIONS

English translation of Office Action for South Korean Patent Application No. 10-2024-7022069, mailed on Jun. 18, 2026, 6 pages.

* cited by examiner

METHOD AND ARRANGEMENT FOR AN X-RAY SOURCE

CROSS REFERENCE TO RELATED APPLICATIONS

This application is a 35 U.S.C. § 371 National Phase Entry Application from PCT Application No. PCT/EP2022/084577, filed on Dec. 6, 2022, entitled “METHOD AND ARRANGEMENT FOR AN X-RAY SOURCE”, and designating the U.S., which claims priority to EP Application Serial No. 21213046.2, filed on Dec. 8, 2021, the disclosures of which are incorporated by reference herein in their entireties.

TECHNICAL FIELD

The present disclosure relates to an X-ray source and a method at an X-ray source.

BACKGROUND

X-ray radiation may be generated by letting an electron beam impact upon a target material. The X-ray radiation may be generated as Bremsstrahlung or characteristic line emission from the target material. The performance of the X-ray source depends inter alia on the characteristics of the focal spot of the X-ray radiation generated by the interaction between the electron beam and the target. Generally, there is a strive for higher brilliance and smaller focal spots of the X-ray radiation, which requires improved control of the electron beam and its interaction with the target. In particular, several attempts have been made to more accurately determine and control the spot size and shape of the electron beam impacting the target.

A Wehnelt cylinder or grid cap, or for short a Wehnelt, is an electrode in an electron emission unit that is used for controlling an electron beam generated by emission of electrons from a cathode (particularly from a thermionic cathode). The use of a Wehnelt is generally known in the art, as for example disclosed in US 2017/0148605.

SUMMARY

The present disclosure relates to an X-ray source and a related method for using grid bias of a Wehnelt in order to compensate for cathode aging. The inventive principles presented herein prolong the effective life of the cathode by using a grid bias of a Wehnelt to compensate for such cathode aging.

A typical cathode for use in an electron gun of an X-ray source comprises a lanthanum hexaboride ($LaB_6$) crystal embedded in a carbon guard ring. In order to emit electrons, the crystal is heated, and this heating causes a slow evaporation thereof. After continued use, an end surface of the crystal may thus retreat into the carbon embedding and the diameter of the end surface may decrease. Both these effects lead to a reduced electron emission angle and consequently a drift in X-ray spot performance.

The present disclosure proposes to compensate for this by applying, and/or adjusting, a bias voltage to the Wehnelt and thereby widen the electron emission angle such that the X-ray spot performance is preserved further. Cathode aging may, for example, be monitored by measuring a quantity indicative of an electron beam width, e.g., the electron beam spot size or a cross-sectional intensity profile of the electron beam for at least two different focus settings and fitting a model of the electro-optical system to the results. From this, a quantity dependent on divergence of the electron beam at an entrance of the electron optic arrangement (which is related to the electron emission angle at the cathode) such as the focus angle (convergence angle) towards the target, the minimum attainable spot size, the size of the electron beam in the focus lens plane, or the divergence of the electron beam divergence as such, may be extracted. With knowledge about how the grid bias affect the emission angle from the cathode and the Wehnelt (or, equivalently, the divergence at the entrance of the electron optic arrangement), and thereby the quantity dependent thereupon, a suitable compensation may then be applied thus prolonging the working life of the cathode.

To only measure the electron beam spot size (or some other quantity related to the cross-sectional intensity profile of the electron beam) for one focus setting does typically not provide enough information to extract e.g. the focus angle as an indicator of electron emission angle from the cathode or divergence at the entrance of the electron optics. The approach proposed herein is to make at least two measurements of the quantity indicative of the electron beam width and to compute the quantity dependent on the electron beam divergence at the entrance of the electron optic arrangement from these measurements. If the actual emission angle from the cathode and the Wehnelt is of interest, it is possible to fit a model of the system to the (at least) two measurements, which is advantageous in that different contributions to changes in the observed spot size may be separated.

In some implementations, however, the need to determine the quantity indicative of the electron beam width at two different focus settings can be avoided. For example, divergence of the electron beam may be deduced from a measurement of to what extent the electron beam is able to pass through an aperture. This may be determined by comparing the total electrical current emitted from the cathode to how much of this total current that passes through the aperture. The fraction of current through the aperture to total emitted current may then be taken as an indication of electron beam divergence. As will be understood, an excess divergence may have the effect that fewer than all electrons emitted from the cathode are able to pass the aperture, and the fewer electrons that pass the aperture the larger the divergence. Similarly, if substantially all electrons emitted from the cathode are able to pass through the aperture, this may be an indication that the divergence from the cathode (or, correspondingly, the electron beam divergence at the entrance of the electron optics) is too small and that a grid bias should be applied to the Wehnelt in order to increase the divergence.

Another option to determine a quantity indicative of the electron beam width is to directly measure the electron beam width at a known distance from the cathode upstream from the electron optic arrangement, i.e. before the electron beam has been shaped or affected by the optics. This could be done, for example, by providing an aperture in a region between the cathode and the electron optics, and by moving the electron beam across the aperture and at the same time measure the amount of electrons that reaches an electron sensor downstream of the aperture. The electron sensor may, for example, be located downstream of the target. In this implementation, the movement of the electron beam across the aperture could be effected, for example, by a lateral movement of the cathode.

Measurement of the cross-sectional intensity profile of the electron beam (e.g. electron beam spot size) can be made by scanning the electron beam over an edge separating two regions with different ability to reflect and/or absorb electrons and recording a plurality of values for a quantity indicative of an intensity of the electron beam, wherein the plurality of values is recorded for a plurality of electron beam positions. The two regions may be provided as different parts of a structured target, e.g. a tungsten layer on a diamond substrate. In another alternative, the two regions may be provided by a target such that the electron beam may be deflected to positions at least partially outside of the target, e.g. a liquid metal jet. The two regions may also be provided as a dedicated calibration object that can be inserted into the electron beam path, or as an aperture that is included as a part of the electron optic arrangement.

Hence, the present disclosure provides a method at an X-ray source comprising an electron source for providing an electron beam and an electron optic arrangement for deflecting and focusing the electron beam towards a target for generation of X-ray radiation, the electron source comprising a cathode, a Wehnelt, and an anode. The method comprises determining a quantity indicative of a width of the electron beam; computing a quantity dependent on the electron beam divergence at the entrance of the electron optic arrangement (i.e. where the electron beam enters the electron optic arrangement) based on the determined quantity indicative of a width of the electron beam; and applying or adjusting a bias voltage to the Wehnelt such that the quantity dependent on the electron beam divergence at the entrance of the electron optic arrangement is adjusted towards a desired value.

In general, it is preferred that the bias voltage applied to the Wehnelt is such that the electron beam spot size on the target approaches a desired value, i.e. that a desired electron spot can be obtained using the electron optic arrangement.

The step of applying a bias voltage to the Wehnelt may be performed by applying or altering a grid bias voltage within a range of +/−10 kV with respect to the cathode.

The anode may be implemented by an anode aperture located between the cathode and the electron optic arrangement. Alternatively, the target itself may constitute the anode.

Due to practical difficulties in directly accessing the cathode and Wehnelt during operation of the X-ray source, it is preferred that the quantity indicative of a width of the electron beam is determined at a location downstream from the electron optic arrangement. This also provides for a computation of the quantity dependent on the electron beam divergence at the entrance of the electron optic arrangement, where the influence of the electron optic arrangement on the electron beam has been taken into account.

The determination of the quantity indicative of a width of the electron beam is preferably made a plurality of times during operation of the X-ray source. Each time that the quantity has been determined and the quantity dependent on the electron beam divergence at the entrance of the electron optic arrangement has been computed, the bias voltage applied to the Wehnelt can be updated to compensate for cathode aging such that a desired focus of the electron beam at the target is maintained for an extended period of time. Such update can be done, for example, upon request by an operator, due to a trigger from one or more monitoring systems in the X-ray source, or at predetermined occasions during the service life of a particular cathode. The predetermined occasions may, for example, be at regular intervals or at progressively shorter intervals towards the expected end of life for the cathode.

In another aspect, there is provided an X-ray source comprising an electron source for providing an electron beam, the electron source comprising a cathode, a Wehnelt, and an anode. The X-ray source further comprises an electron optic arrangement configured to deflect and focus the electron beam towards a target for generation of X-ray radiation; an arrangement for determining a quantity indicative of a width of the electron beam; and a controller operatively connected to the electron source, the electron optic arrangement, and the arrangement for determining a quantity indicative of a width of the electron beam. The controller is configured to compute a quantity dependent on the electron beam divergence at the entrance of the electron optic arrangement based on determinations of the quantity indicative of the electron beam width; and to apply or adjust a bias voltage to the Wehnelt such that the quantity dependent on the electron beam divergence at the entrance of the electron optic arrangement is adjusted towards a desired value.

The present invention contemplates different types of X-ray generating targets. The target may, for example, comprise a solid target, such as a solid reflection target or a solid transmission target. A solid target may be provided as a stationary or a moving (e.g. a rotating anode) target. In other implementations, the target may comprise a liquid target, such as a liquid jet target (e.g. a liquid metal jet target).

Several modifications and variations are possible within the scope of the invention. In particular, X-ray sources comprising more than one target, or more than one electron beam are conceivable within the scope of the present inventive concept. Furthermore, X-ray sources of the type described herein may advantageously be combined with X-ray optics and/or detectors tailored to specific applications exemplified by but not limited to medical diagnosis, non-destructive testing, lithography, crystal analysis, microscopy, materials science, microscopy surface physics, protein structure determination by X-ray diffraction, X-ray photo spectroscopy (XPS), critical dimension small angle X-ray scattering (CD-SAXS), wide-angle X-ray scattering (WAXS), and X-ray fluorescence (XRF).

In the context of the present invention, the determination of a cross-sectional intensity profile of the electron beam should be understood in a broad sense. It is generally not required to acquire a full intensity profile that provides the intensity at every point of the electron beam cross-section. Rather, the determination of the cross-sectional intensity profile could be limited to determining, for example, the full width at half maximum (FWHM) of the electron beam; the spot size of the electron beam focus; or any other quantity relating to the cross-sectional intensity profile that can be used for computing some quantity dependent on the divergence of the electron beam at the entrance of the electron optic arrangement, e.g. the focus angle of the electron beam towards the target.

BRIEF DESCRIPTION OF THE DRAWINGS

The following detailed description will be presented with reference to the accompanying drawings, on which FIG. 1 schematically shows an X-ray source with parts and components relevant for this disclosure.

DETAILED DESCRIPTION

Figure 1:
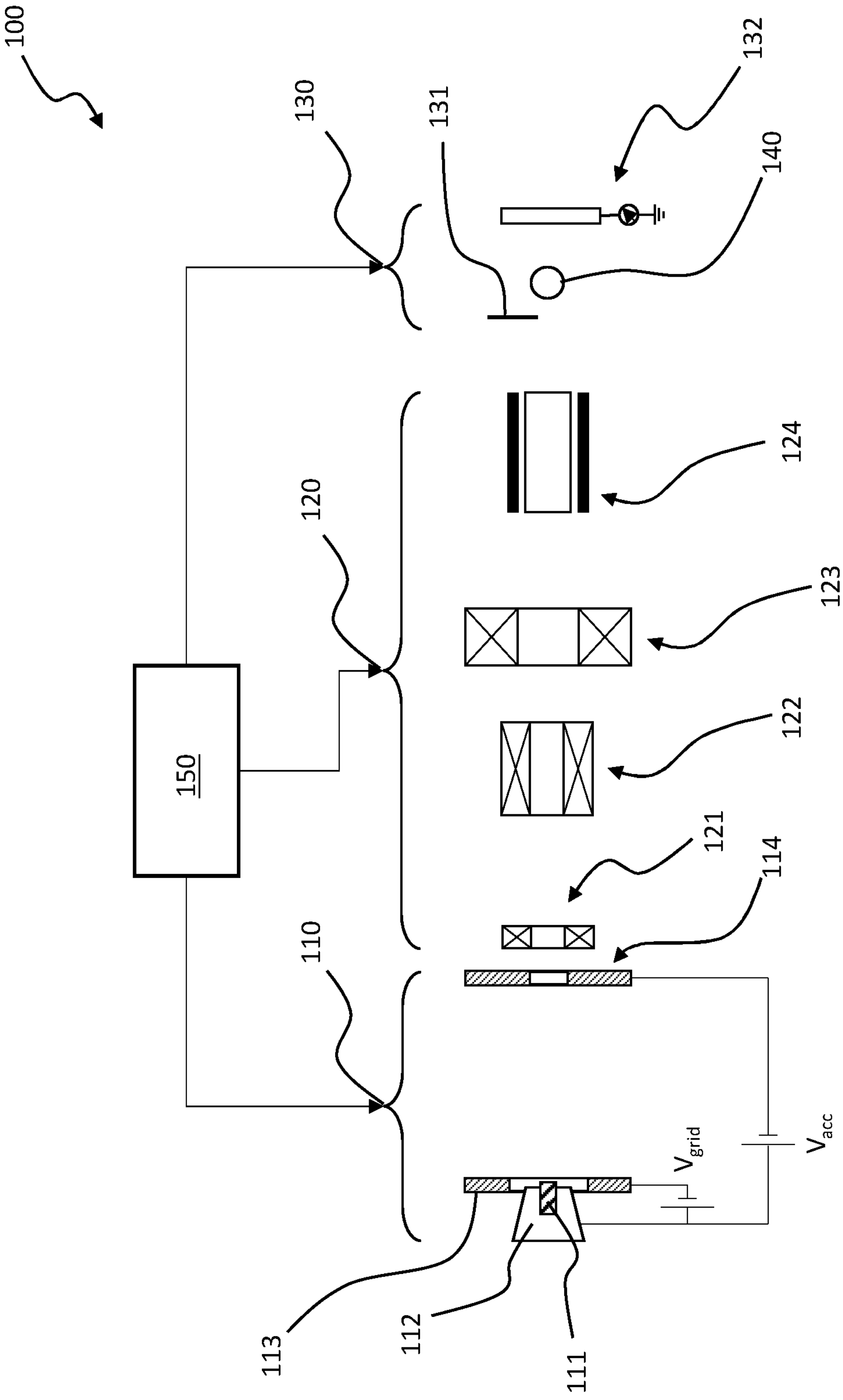

FIG. 1 schematically shows an X-ray source 100 in accordance with the principles disclosed herein. The X-ray source comprises an electron source 110 for providing an electron beam, an electron optic arrangement 120, and an arrangement 130 for determining a cross-sectional intensity profile of the electron beam (or, more generally, an arrangement for determining a quantity indicative of a width of the electron beam).

The illustrated electron source 110 comprises an electron emitter 111 embedded in a carbon guard ring 112, a Wehnelt grid 113, and an anode 114. The electron emitter 111 and the carbon guard ring 112 may herein be collectively referred to as the cathode. As illustrated in FIG. 1, an acceleration voltage $V_{acc}$ is applied between the cathode and the anode during operation in order to accelerate the emitted electrons and form the electron beam. Typical values for the acceleration voltage may be 10-1000 kV. Further, a grid voltage $V_{grid}$ may be applied between the cathode and the Wehnelt to assist in shaping the emitted electron beam. The grid voltage may generally be within a range of +/−10 KV with respect to the cathode. It should be noted that it is not excluded that the grid voltage may be zero, i.e. that the Wehnelt has the same electrical potential as the cathode. The grid voltage will, according to the principles disclosed herein, be adjusted during the operating life of the cathode.

The electron optic arrangement 120 may include various elements for shaping and focusing the electron beam onto a target 140 for generation of X-ray radiation. In the illustrated example, the electron optic arrangement includes an alignment coil 121 for aligning the electron beam along a desired beam path, stigmator coils 122 for introducing a desired astigmatism to the electron beam (which may be zero if a symmetric electron spot is desired), a focus coil 123 for focusing the electron beam, and a deflector 124 for lateral movement of the focused electron beam.

In the illustrated example, the arrangement 130 for determining a cross-sectional intensity profile of the electron beam comprises an electron blocking member or stop 131 and an electron sensor 132. To determine the cross-sectional intensity profile, the electron beam is scanned, using the deflector 124, across an edge defined by the blocking member 131. The amount of electrons that reach the electron sensor 132 will thus depend on to what extent the beam cross section is blocked by the blocking member 131. If the entire electron beam passes the blocking member and reaches the sensor 132, a maximum intensity will be detected. As the electron beam is scanned over the edge of the blocking member 131, gradually fewer electrons will reach the sensor 132 and the electron beam cross-sectional intensity profile can thus be determined from the deflection angle and the corresponding amount of electrons detected by the sensor 132 at different deflection angles. It is then possible to determine various characteristics of the electron beam, such as the FWHM, from the sensor signal at different deflection angles. It is noted that there is a known relationship between deflection angle and the voltage applied to the deflector 124, which makes the determination straightforward.

The X-ray source also includes a controller 150, which is operatively connected to the electron source 110, the electron optic arrangement 120, and the arrangement 130 for determining cross-sectional intensity profiles of the electron beam. The operative connection of the controller is schematically illustrated by arrows in FIG. 1.

Figure 2A:
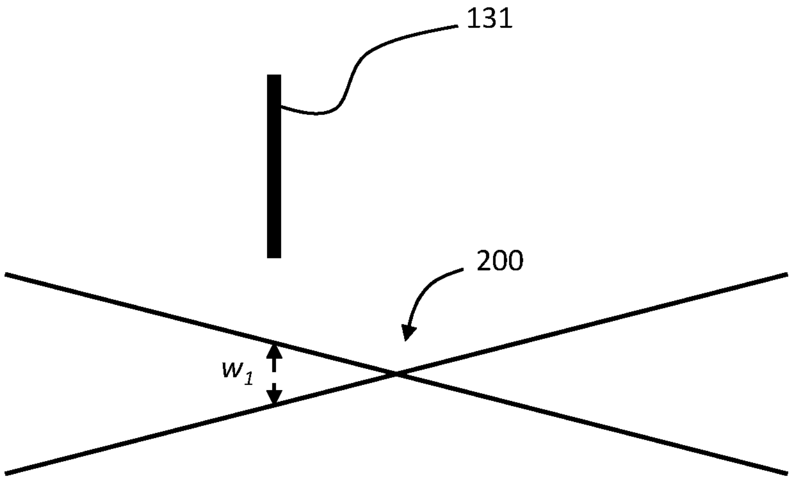
FIGS. 2*a* and 2*b* illustrate how a cross-sectional intensity profile of the electron beam can be determined at two different focus settings.
Figure 2B:
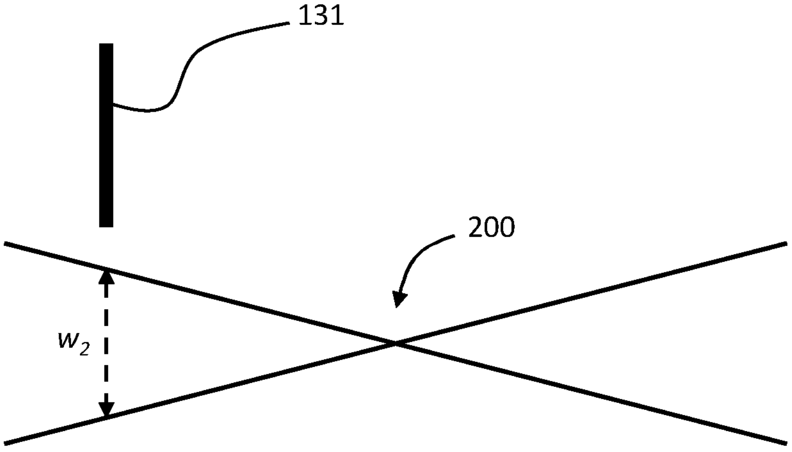

In order to compute a quantity dependent on the divergence of the electron beam at the entrance of the electron optic arrangement 120, e.g. the focus angle of the electron beam (the angle under which electrons converge towards the focus), the cross-sectional intensity profile of the electron beam (e.g. the width thereof) may be determined for at least two different focus settings. This is schematically illustrated in FIGS. 2*a* and 2*b*, which show the location of the electron blocking member 131 relative to the electron beam focus for two different focus settings. In order to determine the cross-sectional intensity profile, the electron beam may be scanned over the edge of the electron stop 131 as discussed above. The profile/width determined at the edge of the stop 131 will depend on the focus setting, i.e. on the location of the electron beam focus illustrated at 200 in FIGS. 2*a* and 2*b*. For a first focus setting, illustrated in FIG. 2*a*, the focus 200 is comparatively close to the electron stop, and the profile/width $w_1$ will thus be determined at a location comparatively close to the focus. For a second focus setting, illustrated in FIG. 2*b*, the focus 200 is comparatively far away from the electron stop, and the profile/width $w_2$ will thus be determined at a location comparatively far away from the focus. With these two measurements of the electron beam profile/width, the convergence or focus angle of the electron beam towards the focus can be determined.

In the illustrated example, the arrangement for determining a cross-sectional intensity profile of the electron beam includes the electron blocking member 131 and the sensor 132. Alternatively, the electron blocking member 131 could be constituted by the target 140 itself, and in this case the sensor 132 could be a target current sensor sensing the electric current deposited in the target by the electron beam. Further, the sensor 132 could be an electron backscatter sensor sensing electrons scattered from the blocking member 131. Another possibility is to use an X-ray sensor that senses X-ray radiation generated when the electron beam impacts the blocking member 131 (which may be particularly useful when the blocking member 131 is constituted by the target 140).

As discussed herein, the focus angle will depend on the angle under which electrons are emitted from the cathode and the Wehnelt. Thus, if a focus angle is determined that is not optimal for interaction with the target to generate X-ray radiation, a bias voltage can be applied to the Wehnelt such that the focus angle is adjusted towards a desired value.

Figure 3:
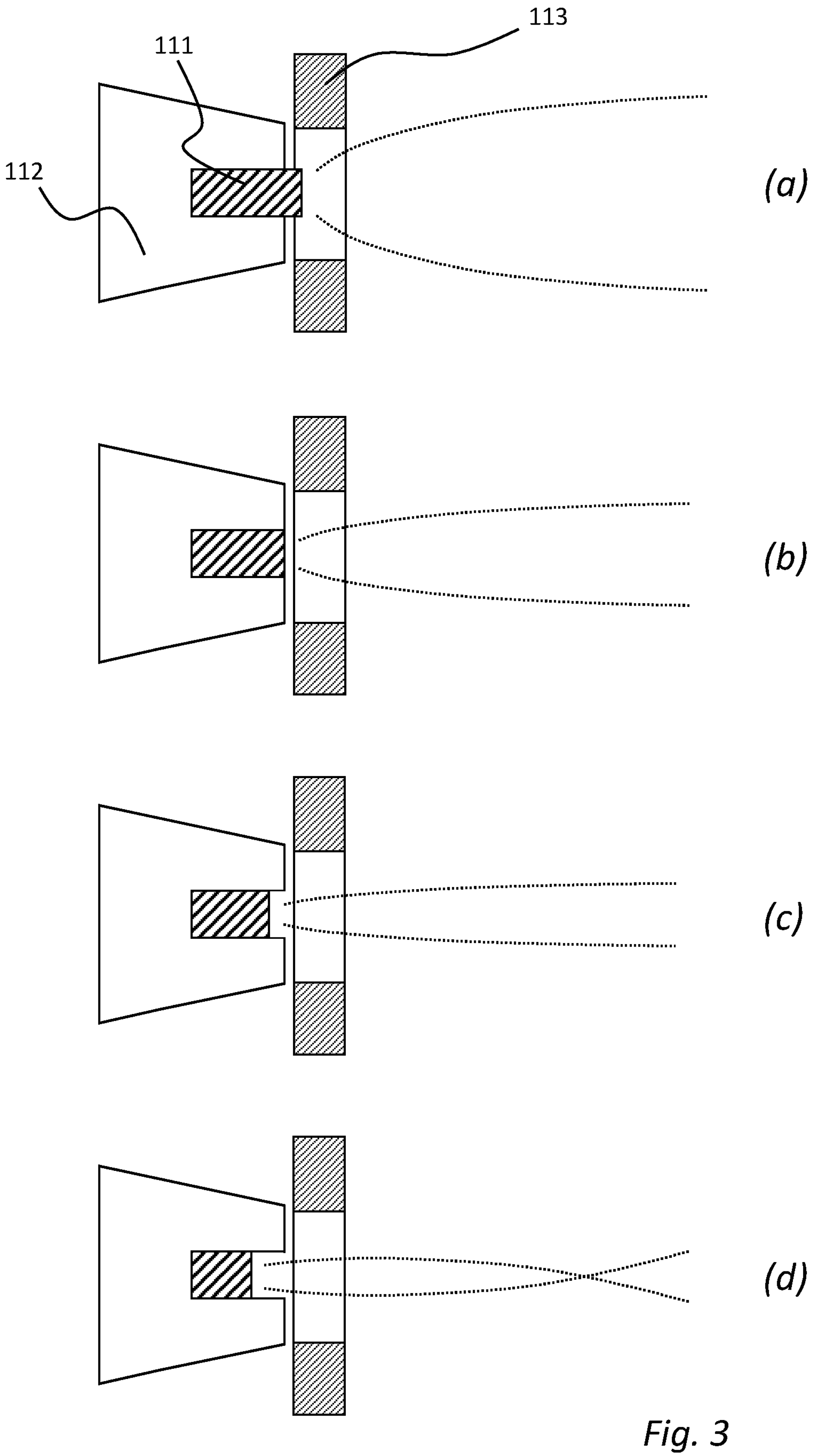
FIGS. 3*a-d* illustrate how ageing of the cathode can cause a change in the electron beam profile.

FIGS. 3*a-d* schematically show progressive ageing of the cathode, where FIG. 3*a* represents a newly installed cathode and FIGS. 3*b-d* show how the electron emitter 111 progressively retreats back into the carbon guard ring 112 as the cathode ages. The electron emission is schematically shown by the dotted lines in FIG. 3. The desired emission angle from the cathode may be represented by the illustration in FIG. 3*a*. As will be understood, in order to obtain this desired electron emission angle also for an electron emitter that has retreated back into the carbon guard ring, as illustrated in FIGS. 3*b-d*, a grid voltage can be applied to the Wehnelt 113 according to the principles disclosed herein.

Generally, the bias voltage applied to the Wehnelt in order to increase the emission angle from the cathode will be positive relative to the cathode voltage. However, if the cathode has retreated into the carbon guard ring to such an extent that a cross-over, as illustrated in FIG. 3*d*, is obtained, then a broadening of the electron beam could be achieved also using a negative bias voltage to increase the divergence downstream of the cross-over.

Figure 4:
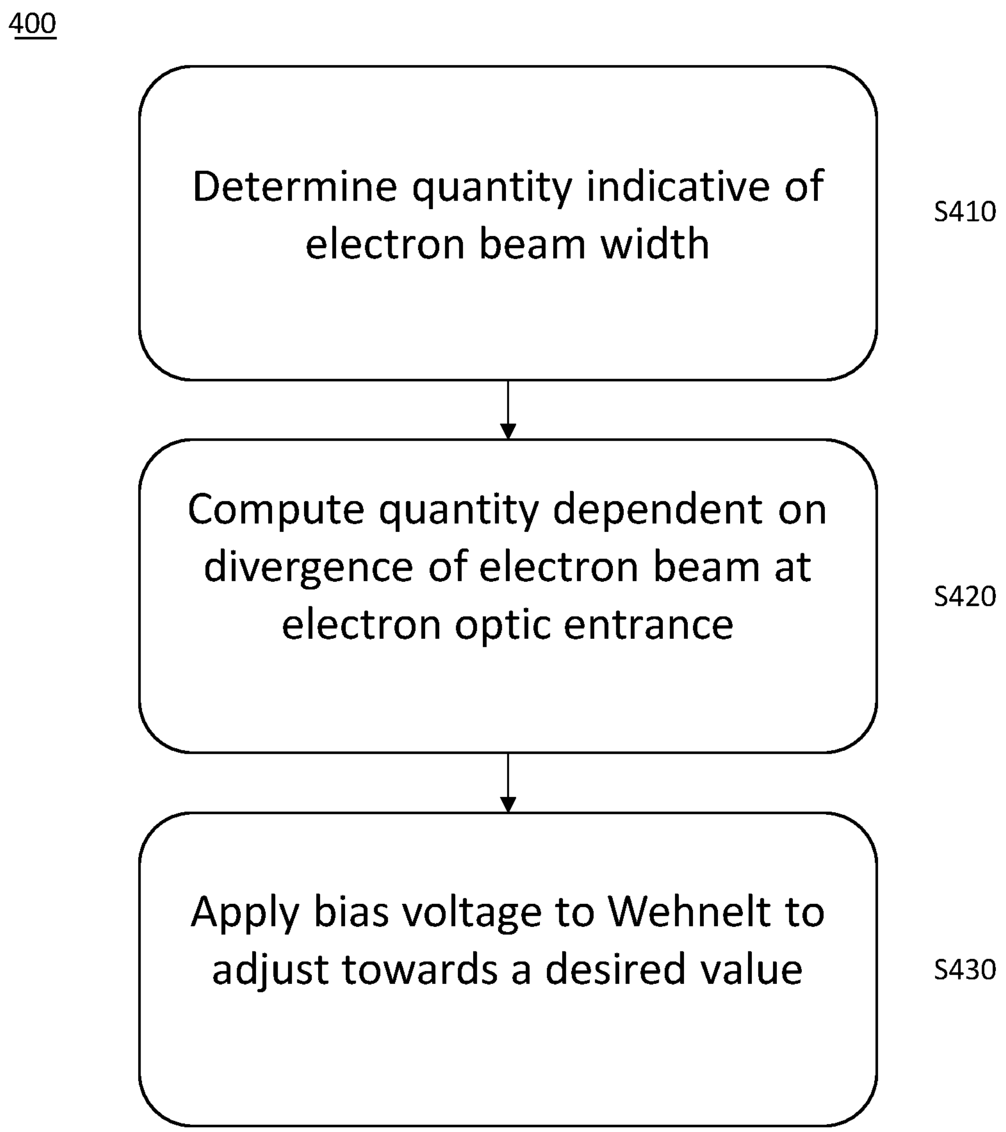
FIG. 4 is a flow diagram outlining a method according to the principles disclosed herein.

FIG. 4 is a flow chart outlining a method according to the principles disclosed herein. The method is performed at an X-ray source that comprises an electron source for providing an electron beam, and an electron optic arrangement for deflecting and focusing the electron beam towards a target for generation of X-ray radiation. The electron source comprises a cathode, a Wehnelt, and an anode. The method comprises the steps of determining S410 a quantity indicative of a width of the electron beam; computing S420 a quantity dependent on a divergence of the electron beam at an entrance of the electron optic arrangement based on the determined quantity indicative of the width of the electron beam; and applying S430 a bias voltage to the Wehnelt such that the quantity dependent on the divergence of the electron beam at the entrance of the electron optic arrangement is adjusted towards a desired value. The steps S410-S430 can conveniently be repeated a plurality of times during the service life of a particular cathode in order to compensate for ageing thereof. The method may be triggered manually by an operator, or automatically. Automatic triggering could be based on various inputs, such as a secondary indication that a desired focus is no longer achieved at the target, or at predetermined occasions during the service life of the cathode. The method could also be triggered, for example, when the X-ray source is started up or when the system is calibrated.

The quantity indicative of the width of the electron beam may be a cross-sectional intensity profile of the electron beam, or a width of the electron beam at a predetermined fraction of a maximum intensity thereof, e.g. the FWHM. Conveniently, the quantity indicative of the width can be determined downstream from the electron optic arrangement, e.g. by determining a cross-sectional intensity profile or a width of the electron beam.

A preferred method to determine the quantity indicative of the electron beam width is to scan the electron beam over an edge separating two regions having different abilities to reflect and/or absorb electrons, and detecting electrons as a function of the electron beam location relative to the edge. For example, electrons can be detected as a function of relative electron beam location relative to the edge using an electron backscatter sensor, a sensor detecting electrons downstream of the target location, or using a target current sensor that senses the electrical current delivered to the target by the electron beam. It is also possible to use an X-ray sensor detecting X-ray radiation that is generated during scan of the electron beam.

Figure 5:
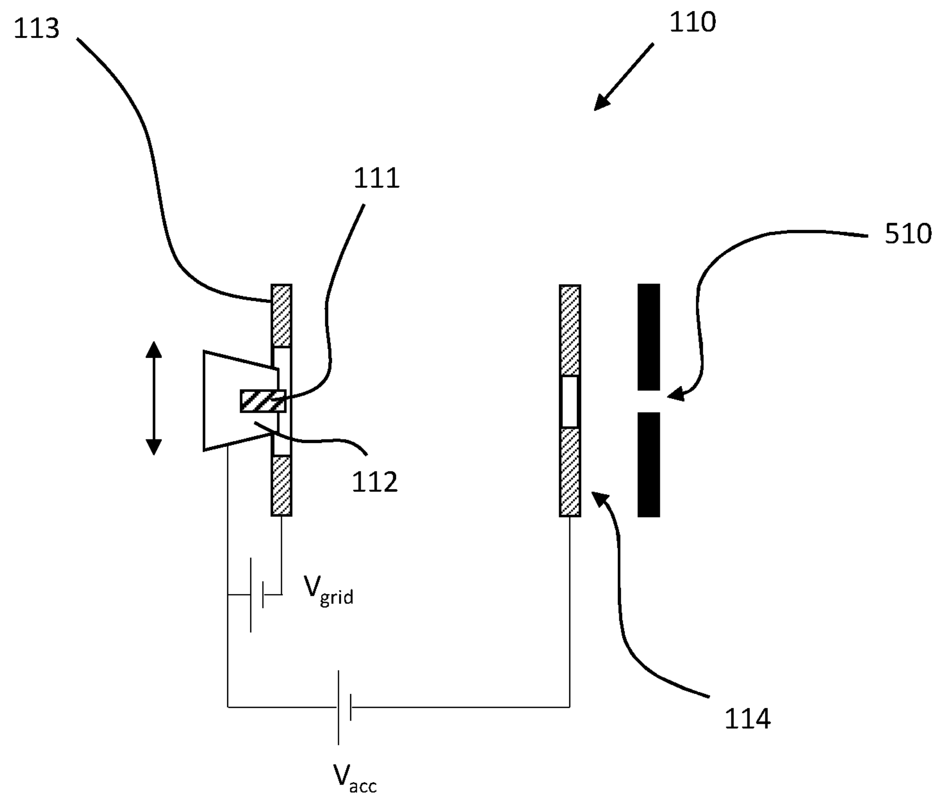
FIG. 5 schematically shows an electron source provided with an aperture for determining an electron beam width.

FIG. 5 schematically shows an alternative implementation of the X-ray source. Similar to the implementations described above, the electron source 110 comprises an electron emitter 111 embedded in a carbon guard ring 112, a Wehnelt grid 113, and an anode 114. In this example, an aperture 510 is provided upstream from the electron optic arrangement 120 (not shown in FIG. 5). Hence, electrons emitted from the cathode 111, 112 will reach the aperture 510 unaffected by the electron optics 120. The divergence of the emitted electrons can then be determined by moving the cathode 111, 112 (and the Wehnelt 113) laterally and detecting electrons that are able to pass through the aperture 510. Electrons that pass through the aperture 510 may, for example, be detected using downstream electron sensor. Lateral movement of the cathode 111, 112 as indicated by the up/down arrow in FIG. 5 will have the effect that a different amount of electrons is able to pass the aperture 510 for each location of the cathode. Hence, the divergence of the emitted electrons can then be determined based on the distance between the cathode 111, 112 and the aperture 510.

It is to be understood that the aperture 510 may be removable, such that it can be inserted into the electron beam path for the purposes of measurements and removed from the electron beam path once the measurements have been completed. Further, the aperture 510 need not necessarily be a separate element, but instead the opening in the anode 114 may be used for this purpose.

Provided that the electron beam is wide compared to the aperture, the electron beam width in the plane of the aperture may be determined by the aperture itself. The electron beam divergence may be estimated by measuring the electron beam current passing through the aperture and calculating what fraction of the current emitted from the cathode this corresponds to. A decreased divergence of the electron beam from the cathode and Wehnelt would correspond to a more narrow electron beam reaching the anode, and a larger fraction of the emitted current would be able to pass through the aperture. By adjusting the Wehnelt bias so that the fraction of emitted current that passes through the aperture is kept close to its initial value, the divergence of the electron beam would also remain close to its initial value, leading to a more consistent performance of the X-ray source over time (i.e. the influence from cathode aging as discussed herein is reduced).

According to the principles disclosed herein, various quantities dependent on the divergence of the electron beam at the entrance of the electron optic arrangement can be used for controlling the grid bias applied on the Wehnelt. For example, the focus angle of the electron beam towards the focus can be computed based on the measured beam properties, and a grid bias can be applied to the Wehnelt such that a desired focus angle is obtained. Similarly, the grid bias can be controlled based on a minimum achievable electron beam spot size, an electron beam diameter (or width or area) in a focus plane. It may even be conceivable to determine the width of the electron beam upstream from the electron optic arrangement, and thereby directly obtaining the divergence of the electron beam at the entrance of the electron optic arrangement.

The invention claimed is:

1. An X-ray source comprising:

an electron source for providing an electron beam, the electron source comprising a cathode, a Wehnelt, and an anode;

an electron optic arrangement configured to deflect and focus the electron beam towards a target for generation of X-ray radiation;

an arrangement for determining a quantity indicative of a width of the electron beam; and a controller operatively connected to the electron source, the electron optic arrangement, and the arrangement for determining the quantity indicative of the width of the electron beam, the controller configured to:

compute a quantity dependent on a divergence of the electron beam at an entrance of the electron optic arrangement based on the quantity indicative of the width of the electron beam; and apply a bias voltage to the Wehnelt to compensate for aging of the cathode, such that the quantity dependent on the divergence of the electron beam at the entrance of the electron optic arrangement is adjusted towards a desired value, wherein the bias voltage is positive relative to a cathode voltage.

2. The X-ray source according to claim 1, wherein the quantity indicative of a width of the electron beam is a cross-sectional intensity profile of the electron beam, or a width of the electron beam at a predetermined fraction of a maximum intensity, such as a full width at half maximum of the electron beam.

3. The X-ray source according to claim 1, wherein the arrangement for determining a quantity indicative of a width of the electron beam is configured to determine a cross-sectional intensity profile or a width of the electron beam at a location downstream from the electron optic arrangement.

4. The X-ray source according to claim 1, wherein the arrangement for determining a quantity indicative of a width of the electron beam is configured to:

scan the electron beam over an edge separating two regions having different abilities to reflect and/or absorb electrons, and detect, using a sensor, a quantity indicative of an intensity of at least a part of the electron beam as a function of electron beam location relative to the edge.

5. The X-ray source according to claim 4, wherein the sensor is selected from the group consisting of:

an electron backscatter sensor;

a target current sensor;

a sensor detecting electrons downstream of the target;

an X-ray sensor.

6. The X-ray source according to claim 1, wherein the arrangement for determining a quantity indicative of a width of the electron beam comprises an aperture and means for measuring a fraction of a current emitted from the cathode that passes through the aperture.

7. The X-ray source according to claim 1, wherein the controller is configured to compute the quantity dependent on a divergence of the electron beam at an entrance of the electron optic arrangement based on the quantity indicative of a width of the electron beam determined for at least two different focus settings of the electron optic arrangement.

8. The X-ray source according to claim 1, wherein the cathode comprises a $LaB_6$ crystal.

9. The X-ray source according to claim 1, wherein the quantity dependent on a divergence of the electron beam at the entrance of the electron optic arrangement is one or more of:

a focus angle;

a spot size;

an electron beam diameter, width or area in a focus lens plane; and a divergence of the electron beam.

10. A method at an X-ray source comprising an electron source for providing an electron beam and an electron optic arrangement for deflecting and focusing the electron beam towards a target for generation of X-ray radiation, the electron source comprising a cathode, a Wehnelt, and an anode, the method comprising:

determining a quantity indicative of a width of the electron beam;

computing a quantity dependent on a divergence of the electron beam at an entrance of the electron optic arrangement based on the determined quantity indicative of the width of the electron beam;

applying a bias voltage to the Wehnelt to compensate for aging of the cathode, such that the quantity dependent on the divergence of the electron beam at the entrance of the electron optic arrangement is adjusted towards a desired value, wherein the bias voltage is positive relative to a cathode voltage.

11. The method according to claim 10, wherein the quantity indicative of a width of the electron beam is a cross-sectional intensity profile of the electron beam, or a width of the electron beam at a predetermined fraction of a maximum intensity, such as a full width at half maximum of the electron beam.

12. The method according to claim 10, wherein determining a quantity indicative of a width of the electron beam comprises determining a cross-sectional intensity profile or a width of the electron beam at a location downstream from the electron optic arrangement.

13. The method according to claim 10, wherein determining a quantity indicative of an width of the electron beam comprises:

scanning the electron beam over an edge separating two regions having different abilities to reflect and/or absorb electrons, and detecting a quantity indicative of an intensity of at least a part of the electron beam as a function of electron beam location relative to the edge.

14. The method according to claim 10, wherein the quantity dependent on a divergence of the electron beam at the entrance of the electron optic arrangement is one or more of:

a focus angle;

a spot size;

an electron beam diameter, width or area in a focus lens plane; and a divergence of the electron beam.

* * * * *